United States Patent [19]

Schmid et al.

[11] 4,358,069

[45] Nov. 9, 1982

[54] PROCESS AND DEVICE FOR GENERATING TAPE TENSION IN A TAPE TRANSPORT APPARATUS

[75] Inventors: Hans Schmid, Limburgerhof; Klaus Becker, Ludwigshafen; Guenter Leuchtmann, Mannheim; Klaus Schoettle, Heidelberg, all of Fed. Rep. of Germany

[73] Assignee: BASF Aktiengesellschaft, Ludwigshafen, Fed. Rep. of Germany

[21] Appl. No.: 199,534

[22] Filed: Oct. 22, 1980

[30] Foreign Application Priority Data

Oct. 24, 1979 [DE] Fed. Rep. of Germany ....... 2942950

[51] Int. Cl.³ .......................... G03B 1/04; G11B 15/32
[52] U.S. Cl. .................................................... 242/192
[58] Field of Search ..................... 242/192, 200–202, 242/204, 208, 210; 226/176, 170, 174

[56] References Cited

U.S. PATENT DOCUMENTS

| 3,093,284 | 6/1963 | Mullin | 226/176 |
| 3,487,175 | 12/1969 | Newell | 360/71 |
| 3,520,495 | 7/1970 | Sotani | 242/192 |
| 3,638,880 | 2/1972 | Hollingsworth | 242/192 |
| 4,018,402 | 4/1977 | Burdorf | 242/192 |
| 4,089,488 | 5/1978 | Isikawa | 242/192 |
| 4,093,150 | 6/1978 | Burdorf et al. | 242/192 |

Primary Examiner—Leonard D. Christian
Attorney, Agent, or Firm—Keil & Witherspoon

[57] ABSTRACT

The generation of tape tension, based on the capacity for elastic flow of elastomeric incompressible layers, in a tape transport apparatus employing at least one capstan in contact with supply and take-up reels of tape is accomplished by producing a higher compressive force at the point of contact between the take-up reel and the resiliently deformable peripheral portion of the capstan than at the point of contact between the supply reel and the capstan. The difference in compressive forces is brought about by an additional force which is produced by means of a drivable rotating body and is transmitted to the tape reel carriers by means of a cable which is guided over this rotating body.

12 Claims, 6 Drawing Figures

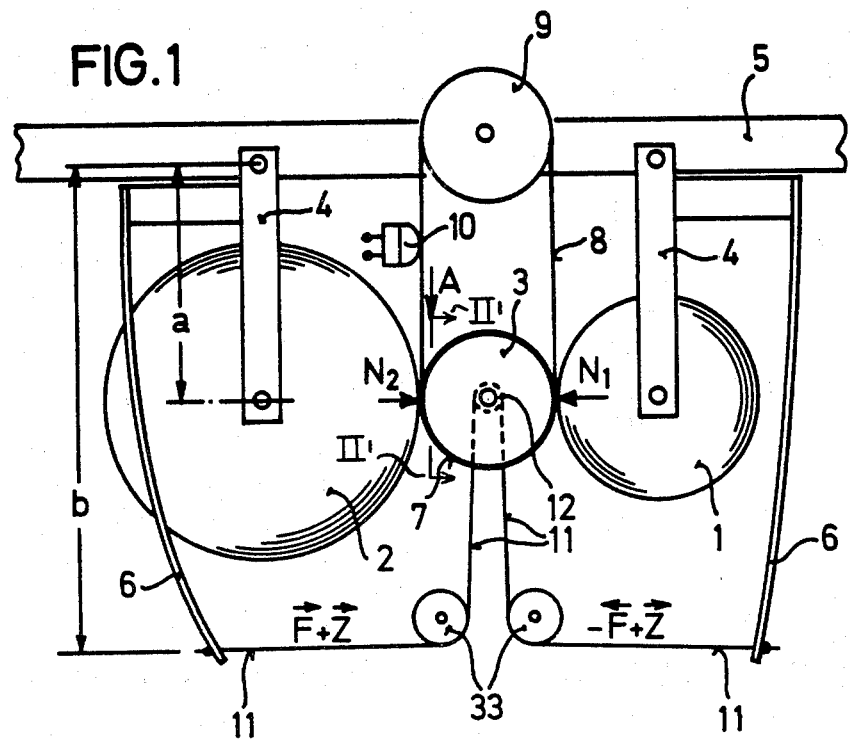
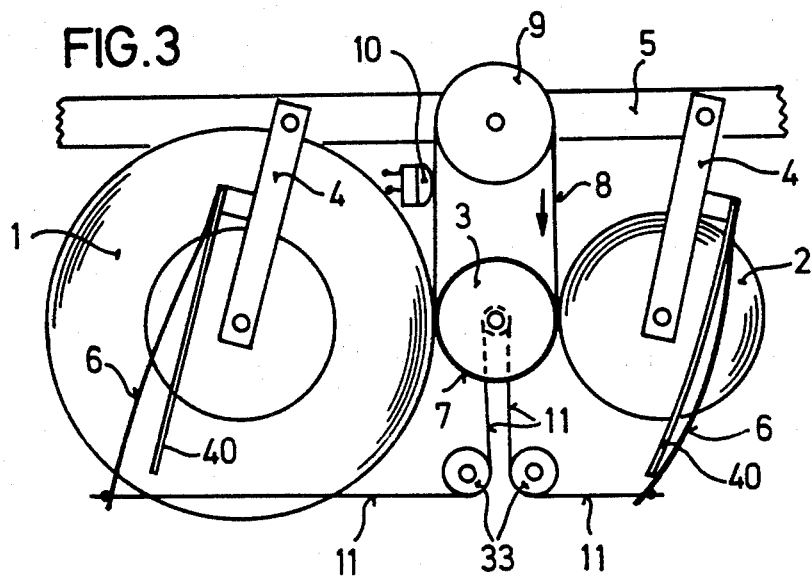

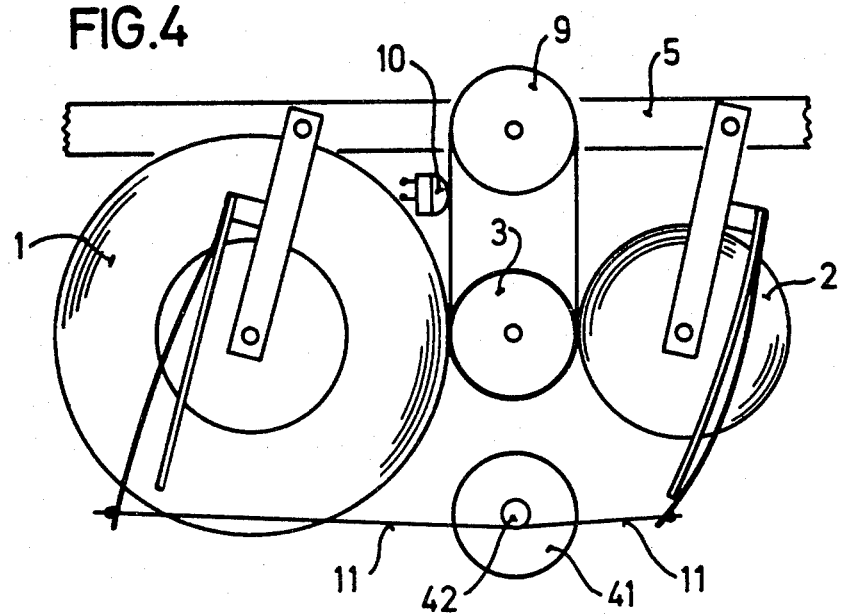

PROCESS AND DEVICE FOR GENERATING TAPE TENSION IN A TAPE TRANSPORT APPARATUS

The present invention relates to a process for generating tape tension in a tape transport apparatus in which a supply reel of tape and a take-up reel of tape are driven simultaneously by at least one capstan, possessing a resiliently deformable peripheral portion, by pressured contact between the peripheries of the reels of tape and of the capstan, and, in order to produce the different degrees of deformation of the resilient covering and hence the different peripheral speeds which generate tension in the section of tape between the two contact points, the compressive force at the point of contact between the take-up reel and the capstan is set to a higher value than the compressive force at the point of contact between the capstan and the supply reel. The invention further relates to a tape transport apparatus for carrying out the process, comprising two tape reels rotatably mounted on movable carriers and serving alternately as supply and take-up reels, at least one capstan, provided with a resilient peripheral portion, for simultaneously driving both tape reels at their peripheries, and biassing means acting on the movable carriers and serving to press the tape reels against the capstan.

In magnetic tape transport apparatuses of this type, which are disclosed, for example, in U.S. Pat. Nos. 3,638,880, 3,093,284 and 3,487,175, the two magnetic tape reels are mounted with their axles of rotation on carriers which can be slid or pivoted toward and away from a capstan which is in a fixed position. A spring, which acts on the carriers, draws the peripheral surfaces of the two tape reels against the resiliently deformable peripheral portion of the capstan, so that simultaneous driving of both reels can be effected. In order to keep the portion of the tape between the two contact points under constant tension, so as to ensure as uniform a contact with the magnetic head as possible, it is possible, as explained in U.S. Pat. No. 3,093,284 referred to above, to utilize the capacity for elastic flow of elastomeric layers which are incompressible, so as to produce, through a higher contact pressure on the take-up reel of tape than on the supply reel of tape, different peripheral speeds of the resilient covering of the capstan at the two points of contact, and hence generate the tension in the portion of tape. This phenomenon is based on the fact that the speed of the part of the covering which is deformed by compressive force is greater than that of the part which is undeformed or deformed to a lesser extent.

To generate the different compressive forces it has been proposed, for example in U.S. Pat. No. 4,093,150 (equivalent to German Laid-Open Application DOS No. 2,825,112), in the case of a reversible tape transport apparatus, to wrap cords, in a braking system, about the shafts of the tape reels and to tension these cords, at one end, by a first spring, which exerts traction toward the capstan, and at the other end by a second spring which exerts traction away from the capstan. Stops are provided for the springs, so that the frictional force which, during operation of the transport apparatus, is produced between the shaft of the supply reel of tape and the cord, and acts in the direction of the first spring, causes the latter to bear against its stop and the second spring to be pulled off its stop. As a result, the second spring is fully effective, via the cord, counter to the spring which acts on the two carriers and produces the compressive force between the tape reels and the capstan, so that the contact pressure is reduced on the supply reel side. In the case of the take-up reel, the compressive force is increased because there the frictional force acts in the opposite direction.

Furthermore, by employing springs possessing different characteristics in the braking system, the shaft of the supply reel of tape is braked more strongly by the friction produced by the cord than is the shaft of the take-up reel.

The braking system, consisting of cords, shafts and springs, is of symmetrical design with respect to the central capstan, and is hence effective in both directions of operation of the transport apparatus.

However, difficulties arise if the direction of tape transportation is changed rapidly, as happens in video recorders. Whilst braking the tape reels to a stop, and reversing their direction of rotation, the frictional forces also drop to zero and then rise again. As a result, during the reversal, the requisite difference between the compressive forces cannot be produced in the braking system, and accordingly the requisite tape tension cannot be generated; this can lead to the formation of tape loops. Equally, the frictional force for generating a braking torque is lacking. A further disadvantage is that the friction between the cords and shafts of the tape reels consumes power. This is particularly undesirable in the case of battery-powered tape transport apparatuses, where the power consumption must be minimized so as to permit the longest possible period of operation with a given set of batteries.

It is an object of the present invention to provide a process for generating tape tension in a tape transport apparatus of the type having at least one capstan to drive supply and take-up reels of tape by surface contact, and a tape transport apparatus for carrying out the process, in which the above disadvantages are avoided and, in particular, due account is taken of the requirement to minimize power consumption for battery operation.

We have found that this object is achieved, according to the invention, if the compressive force, which, when the tape transport apparatus is not in operation, is of the same magnitude at the two points of contact, is increased, when the apparatus is in operation, at the point of contact on the take-up reel, by a force which is produced centrally by a torque which opposes the rotational torque of the capstan, and is reduced at the point of contact on the supply reel. In a tape transport apparatus of the initially described type the invention provides, for this purpose, for the tape reels to be associated with one or more tensioned cables or belts which are guided over a central rotating member which can be driven in the opposite direction to that of the capstan.

In a preferred embodiment of the tape transport apparatus, the rotating member is a cylinder connected to the housing of the capstan motor, the housing being rotatably mounted.

Through the use of simple technical means it is possible, when providing the difference between the compressive forces at the contact points on the supply reel and take-up reel, to dispense with the frictional braking system which increases power consumption.

An important advantage is that, when the tape transport direction is reserved, the centrally generated opposing torque is present even at low speeds of rotation of the motor shaft. This opposing torque is boosted, on reversal of the motor, by the resulting high starting current. Consequently, adequate tape tension is ensured even during reversal. As a result of using an adjustable starting current limiter, the tape direction-reversing sequence can be optimized in respect of tape tension.

Further advantages and details of the invention are disclosed in the following description of the embodiments illustrated in the accompanying drawings, in which FIG. 1 is a plan view of the novel tape transport apparatus with the means for generating tape tension, FIG. 2 is a partial cross-section of the motor designed for driving the capstan and generating tape tension, and the rotational mounting of the motor, FIG. 3 is a plan view of a preferred embodiment of the tape transport apparatus with two pairs of springs as the biassing means, and FIG. 4 is a plan view of an embodiment of the tape transport apparatus with a separate motor for generating tape tension.

Figure 2:
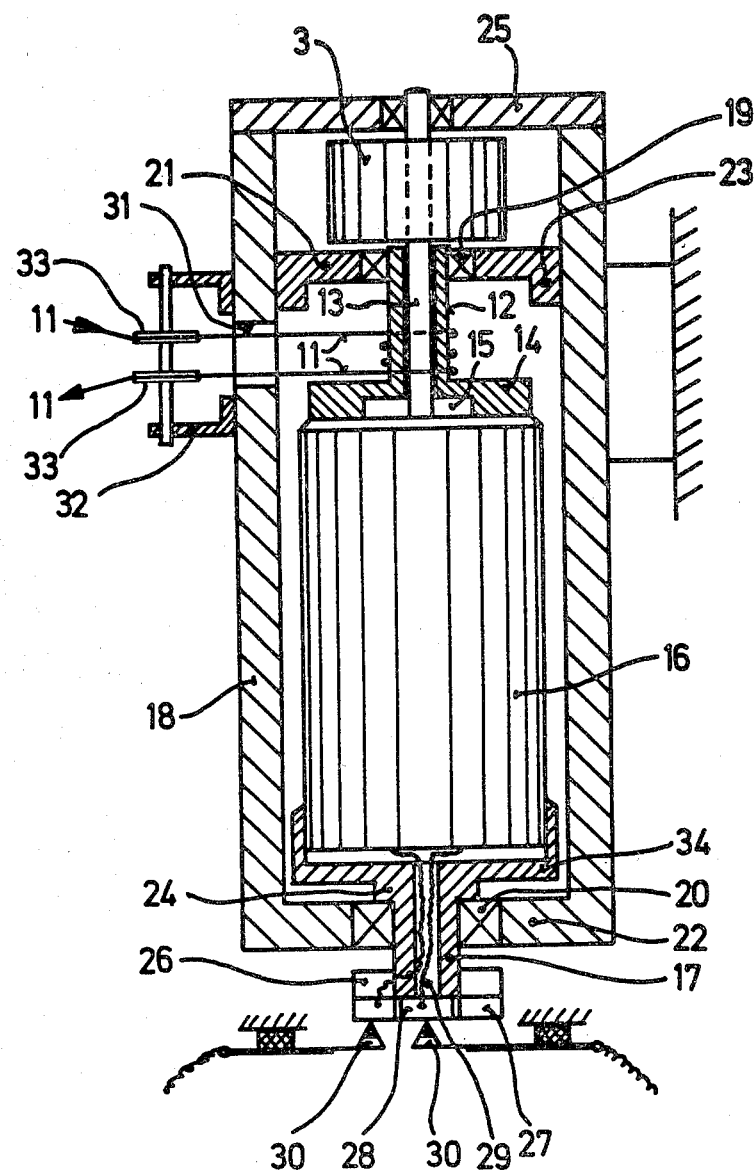

It is well kwown that during the transportation of tape between a supply reel 1 and a take-up reel 2, both tape reels are driven simultaneously by pressured contact between their peripheries and the periphery of a capstan 3 (FIG. 1). The tape reels 1, 2 are rotatably mounted on carriers 4, which are slidably or—as in the present illustrative embodiment—pivotably mounted in a frame 5. Tension springs 6, which are each attached to the carriers 4 and are connected to one another, at their free ends, by a cable 11, ensure that, when the tape transport is not in operation, the two tape reels 1, 2 bear with the same compressive force against the capstan 3, which is in a fixed position. In the embodiment shown in FIG. 1, the tension springs are leaf springs. Of course, other types of springs, for example helical springs, may also be employed; these must then, to produce an equivalent effect, be accomodated between the cable and the carriers by appropriate design measures.

On its periphery, the capstan, which is driven by a motor (not shown in FIG. 1) in the lower part of the tape transport apparatus, is provided with an elastomeric covering 7, so that, in order to generate tension in the portion of tape between the two contact points, the difference in the peripheral speeds of the tape reels, based on the capacity for elastic flow of incompressible rubber-like materials, described above, can be produced.

Between the contact points, the magnetic tape runs over turnaround guide means, for example a reversing guide roller 9. One or more magnetic heads 10 for recording and reproduction cooperate with the loop of tape thus formed. We have found that for optimum tape/head contact the tape portion in question should be under a constant tension of 25 p.

We shall now deal in more detail with the process and device for generating this tape tension.

As already mentioned, constant tape tension is achieved if the take-up reel always runs at a speed which is uniformly higher than that of the supply reel. This can be accomplished by deforming the resilient covering 7 of the capstan 3 to a greater extent at the point of contact with the take-up reel 2, due to the application of a higher compressive force, than on the supply side. This greater deformation results in a more rapid flow of material in the pressure zone than takes place when the covering is less deformed or not deformed at all, so that this higher rate of elastic flow imparts a higher speed to the take-up reel 2 than the speed of the capstan. A higher speed is also imparted to the $N_2=4.00$ $N_1$ the capstan deforms the covering of the capstan. To set up the tape tension, what is essential is that the different peripheral speeds should be produced by applying different compressive forces to the take-up reel and the supply reel.

In order to obtain different compressive forces, the opposing torque (known from electrical drives) of the fixed parts of a motor, namely of the stator and of the housing connected thereto, is utilized, by transferring a force, derived therefrom, to the tension springs 6 with the aid of the cable 11 connecting them, in order to increase the compressive force, by the value of this derived force, at the point of contact with the take-up reel 2, and to similarly reduce the compressive force at the point of contact with the supply reel 1.

As may be seen from FIG. 1, the compressive forces $N_1$ and $N_2$, which are of equal magnitude when the tape transport apparatus is not in operation, are determined by the spring forces F and $-F$, acting on the two halves of the cable, and their transmission to the contact points, in accordance with the lever arm lengths a and b, a being the distance between the pivots of the carriers 4 and the tape reels 1 and 2, and b being the distance between the pivots of the carriers 4 and the points of attachment of the two cable ends to the tension springs 6. Since the spring forces of the two tension springs act in opposite directions, we also have $N_1=N_2$.

Accordingly, for a predetermined value N of the compressive forces $N_1$, $N_2$ the relationship $F=(a/b)N$ applies when the tape transport apparatus is not in operation.

When the tape transport apparatus is in operation, a force Z is generated in the cable 11, which is transferred thereto, with a counter-torque $M_m$, at the pivot radius $\gamma_m$ of the motor housing. The parameter Z is then given by:

$$Z = M_m/\gamma_m$$

The physical relationships on the tape transport apparatus during tape transportation are such that the force Z is always directed toward the supply side, so that more force is applied on the take-up side and less force on the supply side. As a result, when the tape transport apparatus is in operation $$N_1 = \frac{b}{a}(-F+Z)$$
$$N_2 = \frac{b}{a}(F+Z)$$

; it follows that $N_2 > N_1$

The maximum difference between the compressive forces $N_1$ and $N_2$ and hence the maximum tension at which tape transportation is still possible is obtained when the force Z is equal in magnitude to the force F. In this case, the supply reel 1 and the capstan 3 touch without being pressed together, whilst the pressure exerted on the take-up reel is doubled. It then follows from the above equations that:

$$\frac{a}{b} N = \frac{M_m}{\gamma_m}$$

Accordingly, the maximum permissible distance of the points of attachment of the cable ends to the tension springs 6, from the pivots of the carriers 4 is given by $$b = \frac{N \times a \times \gamma_m}{M_m}$$

By way of illustration, the following numerical example is given:

$$N_2 = 4.00 \, N_1$$
$$a = 30 \text{ mm}$$
$$m = 1.40 \text{ mm}$$
$$M_m = 2.24 \text{ mm}N$$

$$b = \frac{4.00 \times 30 \times 1.40}{2.24} = 75 \text{ mm}$$

However, for reliable operation it is advantageous to remain from about 5% to 20%, preferably 10%, below the maximum value.

As already indicated above, the force Z is transferred from the motor housing to the cable 11 by static friction. Of course, a belt may also be used in place of the cable. To transmit the force, the cable 11 is wound around a rotating cylinder 12 (shown in FIG. 2) one or more, preferably three, times. In accordance with the above relationship $Z=M_m/\gamma_m$, the diameter of the cylinder 12 should be minimized in order to maximize the force Z. The cylinder 12, which is hollow to permit the passage of the rotor shaft 13 for the capstan 3, is integral with a disk 14 which has a central opening 15. The disk 14 is connected, preferably by means of screws, to the housing 16 at the end of the motor, through which the rotor shaft 13 passes. A hollow shaft 17 is provided at the other end of the motor and is connected to the motor housing 16 by a cap 34 which fits over the edge of the housing.

The motor housing 16 is rotatably mounted, via the rotating cylinder 12 and the hollow shaft 17, in a U-shaped holder 18 which is connected to the frame 5 of the tape transport apparatus. The ball bearings 19 and 20 for the rotational mounting are accommodated in central openings in a web 21 and the base 22 of the U-shaped holder 18 respectively. The angled ends 23 of web 21 bear snugly against the inner walls of the holder 18. A step 24 on the hollow shaft 17 holds the motor in its terminal position on the base 22.

In a preferred embodiment of the tape transport apparatus the rotor shaft 13 extends beyond the capstan 3, the extension being additionally mounted in a plate 25 which closes the open end of the holder 18 and is fastened to the latter.

This ensures stable and precise true running of the capstan.

Outside the holder 18, the hollow shaft 17 is extended in width by a pressed-on ring 26, which accommodates a slip ring 27, and is shut off centrally by a slip plate 28. The slip ring and slip plate, which are electrically insulated from one another, are connected to the leads 29, running through the hollow shaft 17, of the motor so that power can be supplied to the motor via sliding contacts 30.

If only a few revolutions of the motor housing 16 take place during the entire winding operation (the revolutions result from the change in the distance between the axles of the tape reels 1 and 2 due to the constantly changing ratio of the diameters of the tape reels during winding), power can be supplied to the leads 29 of the motor directly via a flexible cable instead of via sliding contacts. The electrical connection can also be effected via insulated ball bearings 19 and 20.

One of the two arms of the U-shaped holder 18 has a hole 31 for the passage of the cable halves 11 which respectively lead to and from the rotating cylinder 12.

On a level with this hole 31, two guide rolls 33 are rotatably mounted on angle-brackets 32 attached to the arm of the holder, and the two halves of the cable are guided over these pulleys to join up with the tension springs 6.

Figure 5:
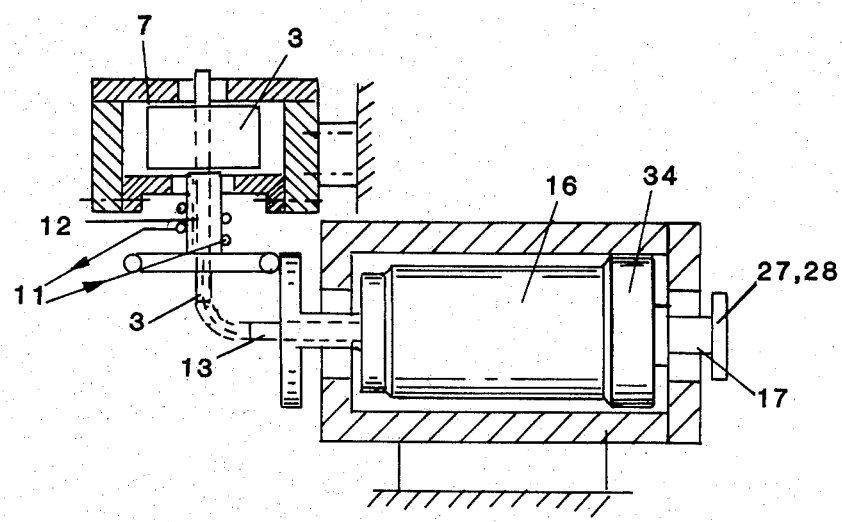
FIG. 5 is an elevational view, partly in cross-section, showing a horizontal arrangement of the motor and schematically indicating the driving of the capstan and of the torque-generating cable system via flexible shaft and friction wheel means, respectively.
Figure 6:
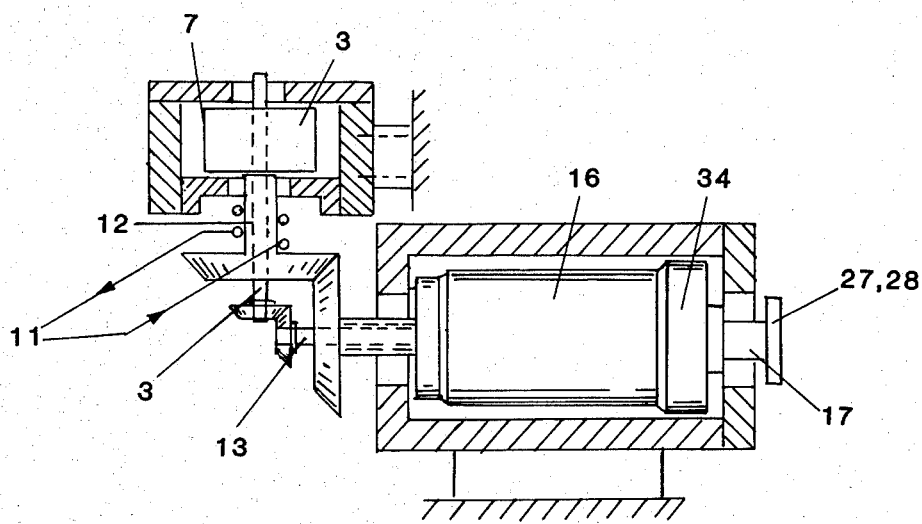
FIG. 6 is an elevational view, partly in cross-section, showing a horizontal arrangement of the motor and schematically indicating the driving of the capstan and of the torque-generating cable system via bevel gears.

In a space-saving embodiment of the tape transport apparatus, indicated in FIGS. 5 and 6 of the drawing, the motor for the capstan 3, together with the means for its rotational mounting, is arranged horizontally relative to the plane of the tape reels and of the capstan. In that case, it is necessary to provide separate holders for the rotational mounting of the motor housing 16, on the one hand, and the capstan 3 and rotating cylinder 12, on the other. Due to the fact that the axes of rotation are at an angle to one another, the capstan 3 and rotating cylinder 12 are driven via bevel gears, as schematically indicated in FIG. 6, preferably with a transmission ratio of 1:1.

For particularly simple adjustment of the angular drive, it is also possible, as schematically indicated in FIG. 5, to use a flexible shaft which is attached, by conventional means to the motor shaft 13 and to the axle of the capstan 3, whilst the transmission of rotation from the motor housing 16 to the rotating cylinder 12 is effected via friction wheel means.

As already explained, the tape tension is constant between the supply reel and the take-up reel if the difference in the peripheral speeds of the two reels is constant. This means that the tension springs 6, which produce the compressive forces between the tape reels and the capstan, on which forces the peripheral speeds depend, must exhibit a constant force F over the range of values of the distance between the axles of the tape reels 1 and 2 (which distance, as mentioned above, changes during the winding operation), it being assumed that the force Z, originating from the counter-torque of the motor housing 16, does not change during tape transportation. This requirement is substantially met by springs which exhibit a soft characteristic.

However, such tension springs have the disadvantage that their stroke, which occurs when the tape transport direction is reversed, and is triggered by the change in direction of the force Z, is large, compared to springs with a hard characteristic, so that a relatively long period is required to set up the force relationships appropriate to the new tape transport direction, during which period the tape is not under tension.

For this reason, in a preferred embodiment of the tape transport apparatus, shown diagrammatically in FIG. 3, stops 40, attached to the carriers 4, are provided for the tension springs 6. During the entire winding operation the force Z causes the tension spring of the take-up reel 2 to bear against the stop associated therewith, and the tension spring of the supply reel 1 to lift off its stop. The soft characteristic of the latter tension spring, which acts against the combination—to be regarded as a fixed point—of the stop and the first tension spring, prevails during the entire operation of transporting the tape from one reel to the other. Advantageously, the stops 40 are rigid.

When the tape transport direction is reversed, the state of operation, described above, of the tension springs 6 is also reversed, and due to the reversal of the force Z the tension spring which was previously not in contact with its stop needs now only to travel the short distance to its stop, whilst the tension spring previously bearing against the stop lifts off therefrom, also travelling a short distance. This means that, due to the fact that the stops 40 are substantially rigid, the tension springs 6 rapidly come into action for the new tape transport direction.

A suitable material of construction for the tension springs 6 is spring steel sheet and preferably spring steel strip. A typical value for the characteristic of the tension springs is a force constant of $8 \times 10^{-2}$ N/mm.

The novel magnetic tape transport apparatus is not restricted to the embodiments shown, but can, within the scope of the invention, be varied in design, using the means familiar to, and the knowledge possessed by, those skilled in the art. For example, the cable can be replaced by two separate cable strands, each of which is attached at one end to a carrier or a tension spring, wound one or more times around the rotating cylinder of the motor housing, and attached at the other end to a fixed point or tensioning element.

Furthermore, in instances where the housing of the capstan motor is not to be used to produce the force stemming from its counter-torque, an additional motor 41 (FIG. 4) can be provided, around whose shaft 42, rotating in the opposite direction to that of the capstan motor, the cable or cables is/are wound one or more times, the two motor systems being wired in series in the electrical circuit.

We claim:

1. For use with a tape transport apparatus in which a supply reel of tape and a take-up reel of tape, each mounted on a moveable carrier, are driven simultaneously by at least one capstan which has a resiliently deformable peripheral portion, and which contacts the peripheries of the reels of tape under pressure,
   a method of producing a higher compressive force, and hence a higher degree of deformation of said resiliently deformable peripheral portion of the capstan, at the point of contact between the take-up reel and the capstan than at the point of contact between the supply reel and the capstan, thereby to generate at said points correspondingly different peripheral speeds and thus create tension in the section of tape between said two points, said method comprising:
   providing a spring-biased cable or belt system interconnecting said carriers, and
   subjecting said spring-biased cable or belt system to forces generated by a positive driving torque at a point common to, and located centrally between, said two reels.

2. The method as claimed in claim 1, wherein the capstan is driven by the shaft of a motor having a housing,
   wherein the compressive force, when the tape transport apparatus is not in operation, is of equal magnitude at said two points of contact, and
   wherein said subjecting step includes respectively increasing and decreasing the compressive force by the torque of the motor housing which torque acts counter to the rotational torque of said motor shaft.

3. In a tape transport apparatus having
   two moveable carriers respectively mounting two reels of tape, alternately serving as supply reel and take-up reel, for rotation,
   at least one motor-driven capstan having a resiliently deformable portion and contacting said reels of tape under pressure, and
   means for producing a higher compressive force, and hence a higher degree of deformation for said resiliently deformable peripheral portion, at the point of contact between the take-up reel and the capstan than at the point of contact between the supply reel and the capstan, thereby to generate at said points correspondingly different peripheral speeds and thus create tension in the section of tape between said two points, said means comprising
   a spring-means biased cable or belt system interconnecting said carriers,
   a rotatable member common to, and centrally located between, said two reels over which member said cable or belt system is guided, and
   means for driving said rotatable member in a sense opposite to that of the capstan so as to impart a positive driving torque to said cable or belt system.

4. In a tape transport apparatus, compressive force producing means as claimed in claim 3,
   wherein said capstan is driven by a motor having a rotatably mounted housing, and
   wherein said rotatable member is a cylinder connected to said housing.

5. In a tape transport apparatus, compressive force producing means as claimed in claim 3, wherein a tensioned cable or belt of said system is wound one or more times around said rotatable member.

6. In a tape transport apparatus, compressive force producing means as claimed in claim 4, wherein said moveable carriers are connected, directly or via said spring means by at least one biased cable or belt which is wound one or more times around said cylinder.

7. In a tape transport apparatus, compressive force producing means as claimed in claim 6,
   wherein a biasing spring is attached to each of said carriers, and
   wherein the two ends of the biasing springs are connected to one another by the cable or belt.

8. In a tape transport apparatus, compressive force producing means as claimed in claim 3, wherein the carriers for the tape reels are each provided with a stop for the baising spring means.

9. In a tape transport apparatus, compressive force producing means as claimed in claim 8, wherein the stops for the biasing spring means are springs having a relatively hard characteristic, whereas the biasing spring means themselves have a relatively soft characteristic.

10. In a tape transport apparatus, compressive force producing means as claimed in claim 4, wherein the motor driving the capstan is disposed horizontally in a plane parallel to that of the tape reels and the capstan.

11. In a tape transport apparatus, compressive force producing means as claimed in claim 10, wherein, in accordance with the angle which the axes of rotation of the motor and the capstan have to one another
    there are provided bevel gears for driving said capstan and said cylinder.

12. In a tape transport apparatus, compressive force producing means as claimed in claim 4, wherein a flexible shaft is provided for driving the capstan, and friction wheel means for driving the cylinder.

* * * * *